(12) United States Patent
Fukuda

(10) Patent No.: US 7,909,229 B2
(45) Date of Patent: Mar. 22, 2011

(54) METHOD FOR JOINING MATERIAL

(75) Inventor: Hiroshi Fukuda, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 329 days.

(21) Appl. No.: 12/093,738

(22) PCT Filed: Nov. 17, 2006

(86) PCT No.: PCT/JP2006/322942
§ 371 (c)(1),
(2), (4) Date: May 15, 2008

(87) PCT Pub. No.: WO2007/058293
PCT Pub. Date: May 24, 2007

(65) Prior Publication Data
US 2009/0236028 A1    Sep. 24, 2009

(30) Foreign Application Priority Data

Nov. 17, 2005  (JP) ................................ 2005-333273

(51) Int. Cl.
*B23K 20/12* (2006.01)
*B29C 65/06* (2006.01)

(52) U.S. Cl. ..................................... 228/112.1; 156/73.5

(58) Field of Classification Search .............. 228/112.1, 228/113, 2.1
See application file for complete search history.

(56) References Cited

U.S. PATENT DOCUMENTS

| 3,477,115 | A  | * | 11/1969 | Martin et al. ............... 228/114.5 |
| 6,290,117 | B1 |   | 9/2001  | Kawasaki et al. |
| 6,880,743 | B1 | * | 4/2005  | Coletta et al. ............. 228/112.1 |
| 2002/0027156 | A1 | * | 3/2002 | Coletta et al. ............. 228/114.5 |
| 2002/0066768 | A1 | * | 6/2002 | Foster et al. ................ 228/112.1 |
| 2002/0119336 | A1 | * | 8/2002 | Kawasaki et al. ............ 428/544 |
| 2004/0118900 | A1 | * | 6/2004 | Stevenson et al. ......... 228/114.5 |
| 2004/0232209 | A1 | * | 11/2004 | Stol et al. .................. 228/112.1 |
| 2005/0178816 | A1 | * | 8/2005 | Stevenson et al. ......... 228/112.1 |
| 2006/0131364 | A1 | * | 6/2006 | Bouet et al. ................ 228/112.1 |
| 2006/0175381 | A1 | * | 8/2006 | Wang et al. ................ 228/112.1 |

(Continued)

FOREIGN PATENT DOCUMENTS

EP          1 400 302 A1     3/2004

(Continued)

OTHER PUBLICATIONS

U.S. Appl. No. 12/447,919, filed Apr. 30, 2009, Fukuda.

(Continued)

*Primary Examiner* — Kiley Stoner
(74) *Attorney, Agent, or Firm* — Oblon, Spivak, McClelland, Maier & Neustadt, L.L.P.

(57) ABSTRACT

A method for joining materials in which a second material is overlapped over a first material preliminarily formed with a joining hole so as to cover the joining hole. A joining tool arranged in alignment with the joining hole is pressed, while rotated, onto the second material so as to locally soften and enter the second material in solid phase state into the joining hole of the first material through frictional heat generated between the joining tool and the second material. The joining tool is pulled out after a geometric engaging part is provided by the second material in relation with the first material and the engaging part is allowed to harden to join the first and second materials.

13 Claims, 5 Drawing Sheets

U.S. PATENT DOCUMENTS

2006/0231594 A1* 10/2006 Murakawa et al. ........ 228/112.1
2007/0116538 A1*  5/2007 Wang et al. .................. 411/60.1
2007/0271764 A1* 11/2007 Stevenson et al. .......... 29/522.1

FOREIGN PATENT DOCUMENTS

| | | |
|---|---|---|
| EP | 1 415 752 A1 | 5/2004 |
| EP | 1 442 820 A1 | 8/2004 |
| JP | 52-123358 | 10/1977 |
| JP | 10 230320 | 9/1998 |
| JP | 2002 153976 | 5/2002 |
| JP | 2004 106037 | 4/2004 |
| JP | 2004 136365 | 5/2004 |
| JP | 2004 148320 | 5/2004 |
| JP | 2005 288525 | 10/2005 |
| JP | 2006-289409 | 10/2006 |
| WO | WO 2005018866 A1 * | 3/2005 |

OTHER PUBLICATIONS

U.S. Appl. No. 12/282,453, filed Sep. 10, 2008, Fukuda.
U.S. Appl. No. 12/518,142, filed Jun. 8, 2009, Fukuda.

* cited by examiner

METHOD FOR JOINING MATERIAL

TECHNICAL FIELD

The present invention relates to a method for joining materials.

BACKGROUND ART

Recently, in an automobile industry, technique for joining different kinds of materials such as aluminum and iron members which are hardly weldable together has become more and more important since lightweight material such as an aluminum member has been positively utilized from a viewpoint of making a vehicle light in weight for improvement of fuel efficiency. Conventionally, different kinds of materials hardly weldable together have been joined together by means of, for example, bolt-on fastening, joining through mechanical clinch or adhesion through adhesive agent.

Conventional technology pertinent to a method for joining materials of the invention has been disclosed, for example, in the following Reference 1.

[Reference 1] JP 2004-136365 A

SUMMARY OF THE INVENTION

Problems to be Solved by the Invention

However, for example, use of bolt-on fastening brings abut projecting of a bolt and a nut on front-back both sides of the joined materials, which leads to a design restriction of ensuring required occupation space for these projections; moreover, in bolt-on fastening, there are fears on loosening and detachment. Use of joining through mechanical clinch may bring about quality defects such as cracks and deformation since the joining is conducted mainly for thin sheets and only through pressing with no addition of heat to the materials.

Use of adhesion through adhesive agent is disadvantageous not only in ill workability and working environment but also ill recyclability due to difficulty in separation of the adhesive agent from the materials upon recycling.

The invention was made in view of the above and has its object to provide a method for joining materials which is free from projections accompanying a design restriction as well as loosening and detachment, which enables joining of materials widely ranging from thinner sheets to thicker plates while preventing quality defects such as cracks and deformation from occurring and which can conduct joining with excellent recyclability while maintaining excellent workability and working environment.

Means or Measures for Solving the Problems

The invention is directed to a method for joining materials characterized in that it comprises overlapping a second material over a first material preliminarily formed with a joining hole so as to cover said joining hole, pressing a joining tool arranged in compliance with said joining hole, while rotated, onto the second material so as to locally soften and enter said second material in solid-phase state into the joining hole of the first material through frictional heat generated between said joining tool and said second material, pulling out said joining tool after a geometric engaging part is provided by said second material in said joining hole in relation with said first material, and allowing said engaging part to harden, thereby joining the first and second materials together.

Thus, the geometric engaging part provided by the hardened second material in the joining hole of the first material in relation with said first material brings about anti-detachment and anti-rotation effects, whereby the first and second materials are strongly joined together.

In this connection, the second material in the joining hole of the first material merely forms the geometric engaging part in connection with said first material and has no projections unlike the bolt and nut in the bolt-on fastening, so that it is free from design restriction of ensuring required occupation space for such projections and there is no fear of loosening and detachment unlike bolt-on fastening.

To the first material preliminarily formed with the joining hole, it is enough to merely soften and enter the second material into the joining hole by the joining tool. Thus, even the first and second materials relatively thick in thickness may be coped with and thus joining can be realized for materials widely ranging from thinner sheets to thicker plates.

Moreover, joining can be completed by softening the second material through imparting frictional heat to the same by means of the joining tool and without applying unreasonable pressure to the first material. Thus, quality defects such as cracks and deformation can be prevented from occurring.

The first and second materials are mechanically jointed together through the engaging part without intermediate such as adhesive agent, so that the joining is free from ill workability and working environment unlike use of adhesive agent and has excellent recyclability since separation is readily performed upon recycling of the materials.

When the invention is worked concretely, the first material may be preliminarily formed with a groove on an inner periphery of the joining hole into which the engaging part is fitted to provide a ridge as the engaging part.

When there is a fear in the invention that the second material overlapped over the first material may be too thin in thickness to be entered into the joining hole without shortage, a portion of the second material corresponding in position to the joining hole of the first material may be thickened in thickness for compensation of material shortage.

It is preferable in the invention that the joining tool having a pin adapted to be inserted into the joining hole is used to enter the second material into the joining hole of the first material. Then, the second material can be surely and deeply entered into the joining hole by the pin.

Joining through pressing of the joining tool onto the second material may be conducted on the second material side by pressing the joining tool onto the second material or on the first material side by pressing the pin of the joining tool through the joining hole onto the second material.

A backing member arranged on a surface of the first material away from the second material may be preliminarily formed with a concave confronting and greater in plane section than the joining hole of the first material, the joining tool being pressed onto the second material on the second material side for joining, the engaging part being provided by an anchoring part formed on the second material through fitting thereof into the concave.

The surface of the first material away from the second material may be preliminarily formed with a concave contiguous with and greater in plane section than the joining hole, the joining tool being pressed onto the second material on the second material side for joining, the engaging part being provided by an anchoring part formed on the second material through fitting thereof into the concave.

The pin of the joining tool may be pressed on the first material side through the joining hole onto the second material for joining, the engaging part being provided by an anchoring part projected from the second material into a gap between a periphery of a pin base-end of the joining tool and a circumference of the joining hole of the first material.

The joining hole of the first material may be preliminarily formed with a taper gradually converging toward the second material, the engaging part being provided by a tapered part on the second material formed through fitting thereof with an internal surface of the joining hole.

When ends of the first and second materials are to be joined together, it is preferable to employ a joint structure with no step such that the ends of the first and second materials facing to each other are complementarily cut out to provide the overlapped portions with a thickness of the single material upon overlapping the ends together.

The joining hole may be spottedly formed on the first material, the joining tool being positioned at a point in compliance with the joining hole so as to conduct spot joining; alternatively, the joining hole may be slottedly formed on the first material, the joining tool being moved longitudinally of the joining hole so as to conduct continuous joining.

Effects of the Invention

A method for joining materials of the invention as mentioned above has various excellent effects and advantages as follows:
(I) Because of no projections such as a bolt and a nut unlike bolt-on fastening, a design restriction can be substantially relieved and there is no fear of loosening and detachment unlike bolt-on fastening. Joining is enabled for materials widely ranging from thinner sheets to thicker plates while preventing quality defects such as cracks and deformation from occurring. Joining with excellent recyclability can be conducted while maintaining excellent workability and working environment.
(II) When the joining tool with a pin adapted to be inserted into the joining hole of the first material is used to enter the second material into the joining hole, the second material can be surely and deeply entered into the joining hole by the pin, so that the first and second materials can be joined together with further enhanced reliability.
(III) When ends of the first and second materials are to be joined together, joint structure with no step may be employed such that the ends of the first and second materials facing to each other are complementarily cut out to provide the overlapped portions with a thickness of the single material, thereby attaining a substantially improved outer appearance as well as space saving of the joined portions between the materials

Figure 1:
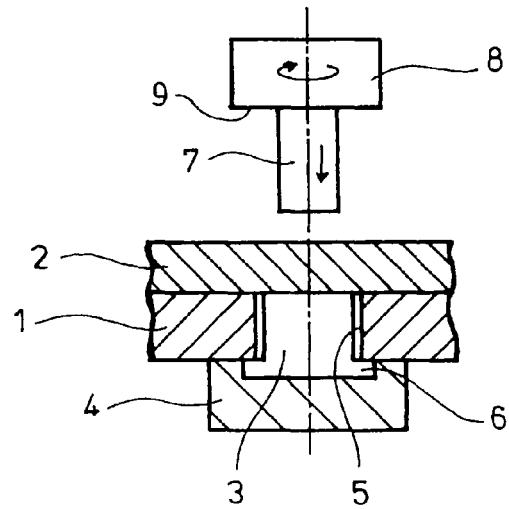
FIG. 1 is a sectional view showing an embodiment of the invention.

EXPLANATION OF THE REFERENCE NUMERALS 1 first material
2 second material
2a protrusion
3 joining hole
4 backing member
5 groove
5' ridge (engaging part)
6 concave
6' anchoring part (engaging part)
7 pin
8 joining tool
9 shoulder
10 concave
10' anchoring part (engaging part)
11 concave
11' anchoring part (engaging part)
12 tapered part

BEST MODE FOR CARRYING OUT THE INVENTION

Embodiments of the invention will be described in conjunction with the drawings.

FIGS. 1-4 show an embodiment of the invention which exemplifies spot joining of first and second materials 1 and 2 or iron and aluminum members. As shown in FIG. 1, the first material 1 is spottedly formed with a joining hole 3 which extends through the material in a direction of its thickness, the second material 2 being overlapped on the first material 1 so as to cover the joining hole 3, a backing member 4 being arranged on a lower surface (or surface away from the second material 2) of the first material 1.

An inner periphery of the joining hole 3 is screw-machined to be formed with a spiral groove 5. The backing member 4 has an upper surface formed with a concave 6 confronting the joining hole 3 of the first material 1 and greater in plane section than the joining hole 3.

Arranged above the second material 2 and coaxially of the joining hole 3 is a cylindrical joining tool 8 with a pin 7 on its lower end adapted to be inserted into the joining hole 3 of the first material 1, the joining tool 8 being supported rotatably and vertically movably by a joining device (not shown).

Figure 2:
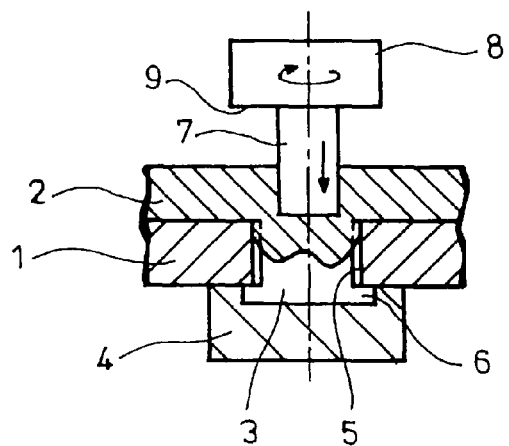
FIG. 2 is a sectional view showing the joining tool of FIG. 1 being lowered while rotated.

The overlapped first and second materials 1 and 2 are joined together by the joining tool 8 which is lowered, while being rotated, to be pressed onto the second material 2 from a state shown in FIG. 1 into that shown in FIG. 2; the second material 2 is locally softened in solid-phase state by frictional heat generated between the joining tool 8 and the second material 2 and is entered into the joining hole 3 of the first material 1.

Figure 3:
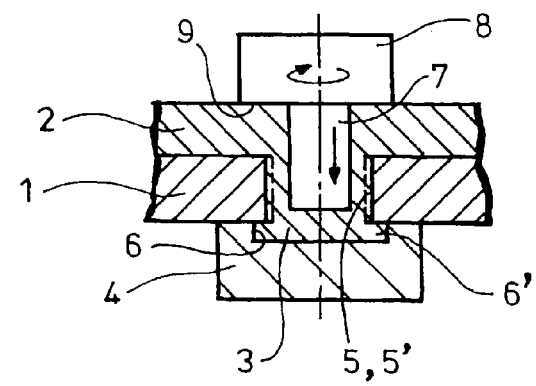
FIG. 3 is a sectional view showing the second material softened in FIG. 2 and entered into the joining hole.

As shown in FIG. 3, the joining tool 8 is further lowered to a position where its shoulder 9 abuts on the surface of the second material 2. As a result, the second material 2 entered in the joining hole 3 is spread all over the joining hole 3 and concave 6 due to plastic flow and pressing, is fitted into the spiral groove 5 of the joining hole 3 to form a spiral (threaded) ridge 5' on the second material 2 and is fitted into the concave 6 of the backing member 4 to form an anchoring part 6' on the second material 2 which is greater in plane section than the joining hole 3. Such ridge 5' and anchoring part 6' provide a geometric engaging part in connection with the first material 1.

Figure 4:
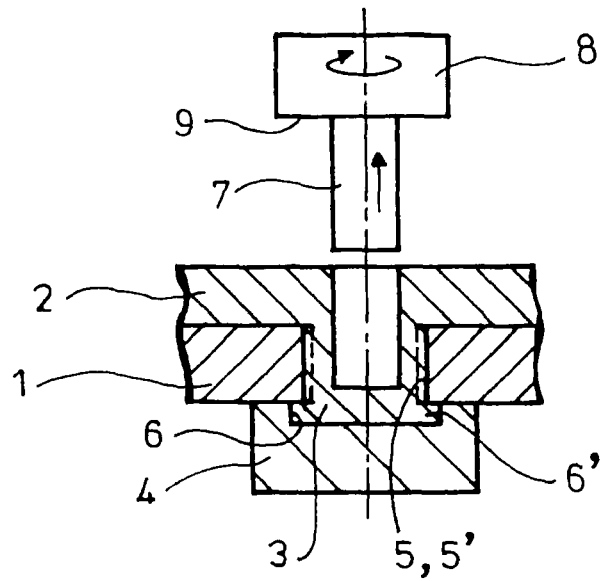
FIG. 4 is a sectional view showing the joining tool lifted from the state shown in FIG. 3.

Then, as shown in FIG. 4, the joining tool 8 is pulled out upwardly and the ridge 5' and anchoring part 6' are allowed to harden. As a result, the ridge 5' and anchoring part 6' provided by the hardened second material 2 in the joining hole 3 of the first material 1 and in connection with the first material 1 bring about anti-detachment and anti-rotation effects, leading to strong joining of the first and second materials 1 and 2 together.

Figure 5:
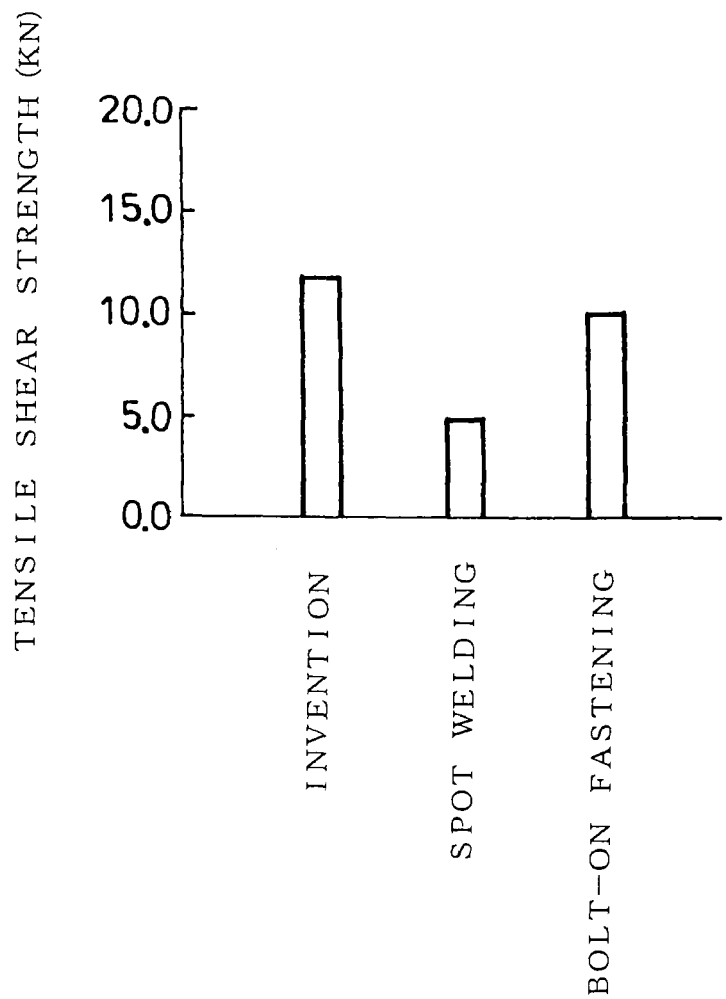
FIG. 5 is a graph showing results of verification experiments on strength comparison (tensile shear)

In fact, as shown in the graph of FIG. 5, verification experiments on strength comparison (tensile shear) (in joining of an aluminum member with a thickness of 6 mm with an iron member with a thickness of 5 mm) conducted by the inventor revealed that it can have tensile shear strength markedly higher than that obtained in spot welding of one kind of materials or aluminum members each with a thickness of 5 mm together and that it can have remarkably high tensile shear strength even in comparison with bolt-on fastening.

More specifically, the combined spiral ridge 5' with anchoring part 6' brings about fixing of the first and second materials 1 and 2 so as not to be relatively moved axially (vertically in FIG. 4) of the joining hole 3, thus attaining the anti-detachment effect; with such axial relative movement being fixed, the rotation about the axis accompanying the axial relative movement becomes impossible (the groove 5 on the joining hole 3 is threadedly engaged with the ridge 5' on the second material 2), thereby attaining the anti-rotation effect.

Exemplified in the above is the spiral groove 5 screw-machined on the inner periphery of the joining hole 3. However, the groove 5 is not necessarily restricted to be spiral formation; for example, even combination of the ring- and spline-shaped grooves 5 (or combination of the spiral and spline-shaped grooves 5) can obtain the anti-detachment and anti-rotation effects even without the anchoring part 6'.

In the embodiment, when the first and second materials 1 and 2 are to be firmly joined together, the second material 2 entered into the joining hole 3 of the first material 1 merely forms the ridge 5' and anchoring part 6' in relation with the first material 1 and as geometric engaging part and has no projections unlike a bolt and a nut in bolt-on fastening, so that it is free from a design restriction of ensuring required occupation space for such projections and there is no fear of loosening and detachment unlike bolt-on fastening.

To the first material 1 preliminarily formed with the joining hole 3, it is enough to merely soften and enter the second material 2 into the joining hole 3 by the joining tool 8. Thus, even the first and second materials 1 and 2 relatively thick in thickness may be coped with and thus joining can be realized for materials widely ranging from thinner sheets to thicker plates.

Figure 6:
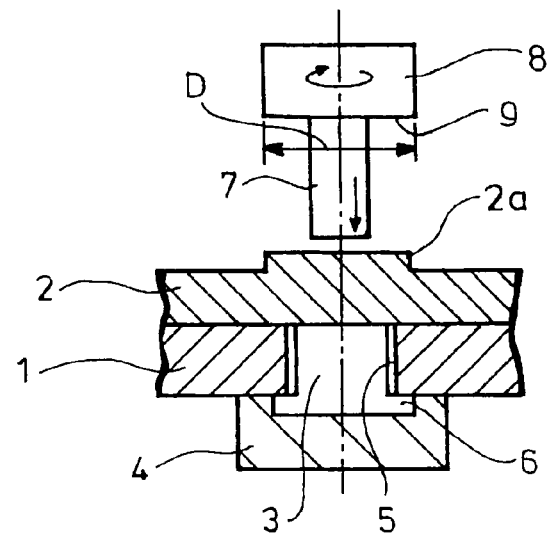
FIG. 6 is a sectional view of a variation with a protrusion on the second material.

When there occurs a situation that the second material 2 overlapped over the first material 1 is too thin in thickness to be entered into the joining hole 3 without shortage, resulting in failure of full filling of the concave 6 on the backing member 4, a surface of the second material 2 just above the joining hole 3 of the first material 1 may be integrally provided with a protrusion 2a as shown in FIG. 6; alternatively, a separate piece (not shown) of the second material is added as said protrusion 2a so as to attain partial increase in thickness, whereby material shortage is compensated to surely fill the concave 6 on the backing member 4 with the second material 2.

In this case, when the protrusion 2a is sized to be within the outer diameter D of the shoulder 9 on the joining tool 8, then the protrusion 2a can be softened into flatness with no remainder by the shoulder 9, thereby finally making flat the upper surface on the second material 2.

Joining can be completed by softening the second material 2 through imparting frictional heat to the same by means of the joining tool 8 and without applying unreasonable pressure to the first material 1. Thus, quality defects such as cracks and deformation can be prevented from occurring.

The first and second materials 1 and 2 are mechanically joined through the ridge and anchoring parts 5' and 6' without intermediate such as adhesive agent, so that the joining is free from ill workability and working environment unlike use of adhesive agent and the joining with excellent recyclability can be realized which can be readily separatable upon recycling.

Thus, the above embodiments can attain various excellent effects and advantages such that, because of no projections such as bolt and a nut unlike bolt-on fastening, a design restriction can be substantially relieved and there is no fear of loosening and detachment unlike bolt-on fastening; joining is enabled for materials widely ranging from thinner sheets to thicker plates while preventing quality defects such as cracks and deformation from occurring; and the joining with excellent recyclability can be conducted while maintaining excellent workability and working environment.

Figure 7:
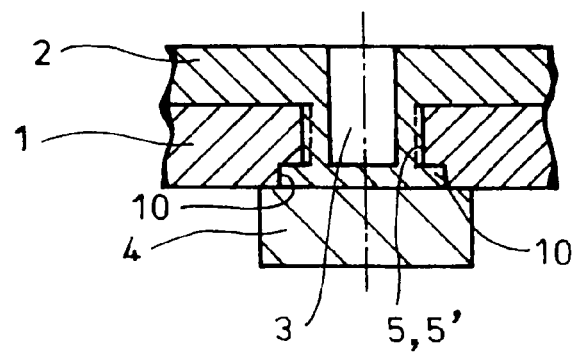
FIG. 7 is a sectional view of a variation with a concave on the first material.

The above embodiments are exemplified with the concave 6 formed on the backing member 4; alternatively, as shown in FIG. 7, a lower surface of the first material 1 (away from the second material 2) may be counter-bored to provide a concave 10 contiguous with the joining hole 3 and greater in plane section than the joining hole 3, the backing member 4 with a flat upper surface being used.

Then, the second material 2 softened through imparting frictional heat to the same by means of the joining tool 8 and entered into the joining hole 3 is fitted into the concave on the lower surface of the first material 1 to thereby form an anchoring part 10'. Thus, the lower surface of the first material 1 can be finally made flat.

Figure 8:
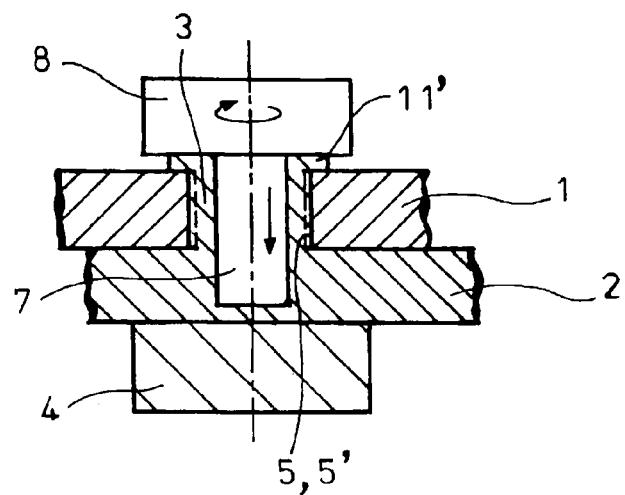
FIG. 8 is a sectional view of a variation with joining being attained on the first material side by the pin of the joining tool.

As shown in FIG. 8, with the first and second materials 1 and 2 overlapped in reversed positions, the pin 7 of the joining tool 8 may be pressed from above through the joining hole 3 of the first material 1 onto the second material 2 for joining. Then, the second material 2 is locally softened in solid-phase state by the frictional heat generated between the joining tool 8 and the second material 2, press-in of the joining tool 8 causing the softened second material 2 to blow up around the pin 7 so that it is fitted into the spiral groove 5 on the joining hole 3 to form the spiral (threaded) ridge 5' on the second material 2, and is projected into a gap between the shoulder 9 at the periphery of a pin 7 base-end of the joining tool 8 and a circumference of the joining hole 3 of the first material 1 to form an anchoring part 6' on the second material 2 greater in plane section than the joining hole 3, the geometric engaging part being provided by the ridge 5' and the anchoring part 6' in connection with the first material 1.

In this case, when no anchoring part 6' is required to be formed, the pressing operation may be continued until the shoulder 9 of the joining tool 8 abuts or is pressed on the upper surface of the first material 1, which can finally make flat the upper surface of the first material 1.

Figure 9:
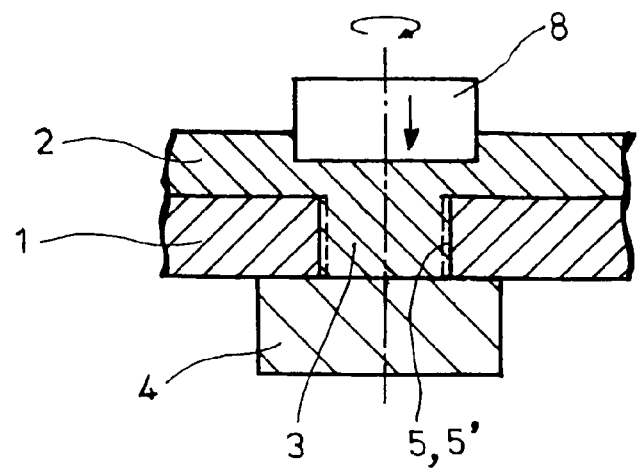
FIG. 9 is a sectional view of a variation using a joining tool with no pin.

The above-mentioned embodiment and variations are exemplified with the joining being conducted, using the joining tool 8 with the pin 7 adapted to be inserted into the joining hole 3 of the first material 1; alternatively, as shown in FIG. 9, joining of the first and second material 1 and 2 may be conducted, using the joining tool 8 with no pin 7.

Figure 10:
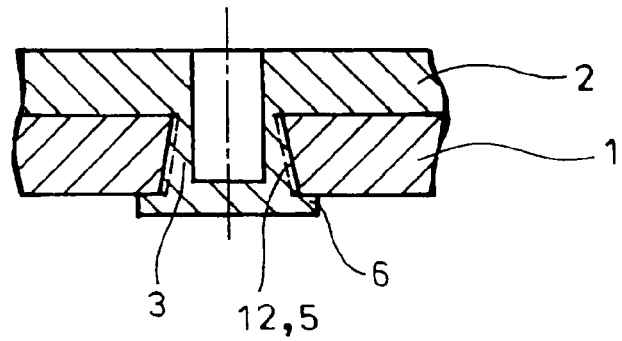
FIG. 10 is a sectional view of a variation with tapered joining hole.

As shown in FIG. 10, the joining hole 3 of the first material 1 may be preliminary formed with a taper gradually converging toward the second material 2, the engaging part being provided by a tapered part 12 on the second material 2 formed through fitting thereof with the internal surface of the joining hole 3. In this case, it is preferable that the inner periphery of the joining hole 3 is formed with (for example, spiral, ring-shaped or spline-shaped) groove 5 similar to that mentioned in the above for synergism.

Figure 11:
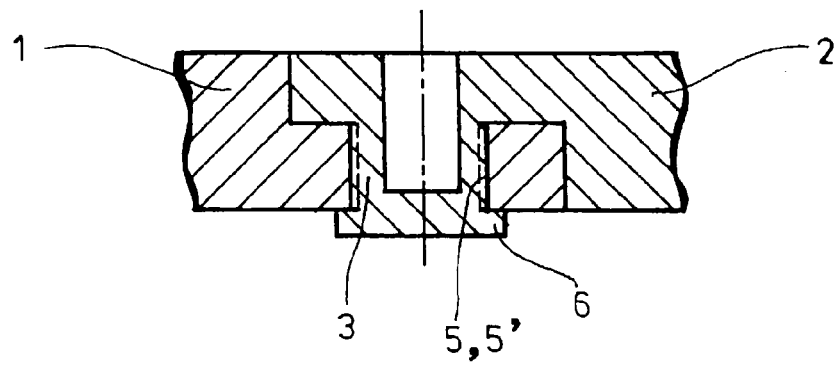
FIG. 11 is a sectional view of a variation in the form of joint structure having joined portions with no steps.

When ends of the first and second materials 1 and 2 are to be joined together as shown in FIG. 11, it is preferable to employ a joint structure with no step such that the ends of the first and second materials 1 and 2 facing to each other are complementarily cut out to provide the overlapped portions with a thickness of the single material upon overlapping the ends together. Thus, a substantially improved outer appearance and space saving of the joined portions between the first and second materials 1 and 2 can be attained.

Figure 12:
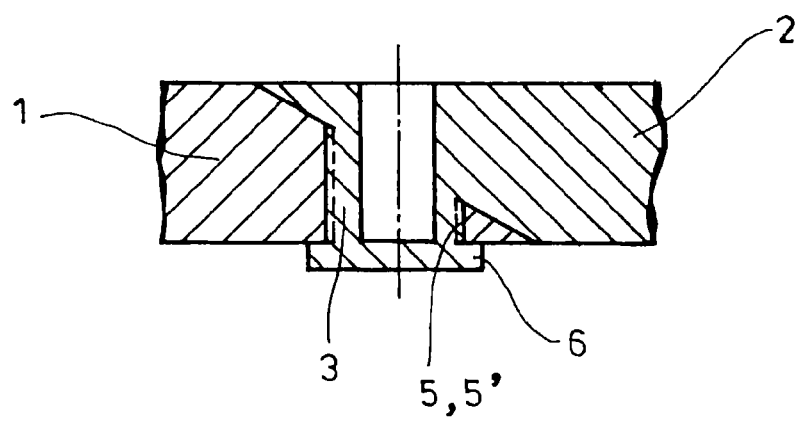
FIG. 12 is a sectional view of a further variation in the form of joint structure having joined portions with no steps.

In the variation shown in FIG. 11, the ends of the first and second materials 1 and 2 are cut out stepwise; alternatively, as shown in FIG. 12, the ends of the first and second materials 1 and 2 may be cut out slantly.

The above-mentioned embodiment and variations are exemplified with the joint hole 3 spottedly formed on the first material 1, the joint tool 8 being positioned at a point in compliance with the joining hole 3 so as to conduct spot joining; alternatively, any of the joining holes 3 shown in FIGS. 1-4 and 6-12 may be extended in a direction perpendicular to the drawing into slotted form so as to conduct continuous joining by means of the joining tool 8 longitudinally of the joining hole 3.

In such continuous joining, the joining tool 8 is moved while rotated, so that a region from a start portion of the joining to just before an ending portion of the joining is sequentially filled with the softened second material 2; finally, the joining is completed into a relatively good outer appearance with a small hole left at the ending portion of the joint.

INDUSTRIAL APPLICABILITY

It is to be understood that a method for joining materials according to the invention is not limited to the above embodiment and variations and that various changes and modifications may be made without leaving the spirit of the invention. For example, the first and second materials may not be of different kinds; that is, the claimed joining method may be also applied to the first and second materials of the same kind. The first material may be of any natures provide that it can be formed with a joining hole. The second material may be any provided that it can be locally softened in solid-phase state by frictional heat; not only metal materials but also polymeric materials may be properly employed.

The invention claimed is:
1. A method for joining materials comprising:
    overlapping a second material over a first material preliminarily formed with a joining hole so as to cover said joining hole;
    rotating and pressing a joining tool arranged in compliance with said joining hole onto the second material so as to locally soften and enter said second material in solid-phase state into the joining hole of the first material through frictional heat generated between said joining tool and said second material;
    pulling out said joining tool after a geometric engaging part is provided by said second material entered in said joining hole in relation with said first material; and
    allowing said engaging part to harden, thereby joining the first and second materials together,
    wherein the first material is preliminarily formed with a groove on an inner periphery of the joining hole, the groove extending for an entire length of the joining hole in a longitudinal direction of the joining hole, the engaging part being provided by a ridge on the second material formed through fitting the second material into said groove.

2. A method for joining materials as claimed in claim 1, wherein a portion of the second material corresponding in position to the joining hole of the first material is thickened in a thickness direction for compensation of material shortage.

3. A method for joining materials as claimed in claim 1, wherein the second material is entered into the joining hole of the first material, using the joining tool having a pin adapted to be inserted into the joining hole.

4. A method for joining materials as claimed in claim 1, wherein the joining tool is pressed on the second material side onto the second material for joining.

5. A method for joining materials as claimed in claim 3, wherein the pin of the joining tool is pressed on the first material side through the joining hole onto the second material for joining.

6. A method for joining materials as claimed in claim 1, wherein a backing member on a surface of the first material away from the second material is preliminarily formed with a concave confronting and greater in plane section than the joining hole of the first material, the joining tool being pressed on the second material side onto the second material for joining, the engaging part being provided by an anchoring part formed on the second material fitted into said concave.

7. A method for joining materials as claimed in claim 1, wherein a surface of the first material away from the second material is preliminarily formed with a concave continuous with the joining hole and greater in plane section than said joining hole, the joining tool being pressed on the second material side onto the second material for joining, an engaging part being provided by an anchoring part formed on the second material fitted into said concave.

8. A method for joining materials as claimed in claim 3, wherein the pin of the joining tool is pressed on the first material side through the joining hole onto the second material for joining, the engaging part being provided by an anchoring part projected from the second material into a gap between a periphery of a pin base-end of the joining tool and a circumference of the joining hole of the first material.

9. A method for joining materials as claimed in claim 1, wherein the joining hole of the first material is preliminarily formed with a taper gradually converging toward the second material, an engaging part being provided by a tapered part on the second material formed through fitting thereof with an internal surface of the joining hole.

10. A method for joining materials as claimed in claim 1, wherein, for joining of ends of the first and second materials together, joint structure with no step is employed such that the ends of the materials facing to each other are complementarily cut out to thereby provide the overlapped portions with a thickness of the single material when the ends are overlapped together.

11. A method for joining materials as claimed in claim 1, wherein the joining hole is spottedly formed on the first material, the joining tool being positioned at a point in compliance with said joining hole so as to conduct spot joining.

12. A method for joining materials as claimed in claim 1, wherein the joining hole is slottedly formed on the first material, the joining tool being moved longitudinally of said joining hole so as to conduct continuous joining.

13. A method for joining materials as claimed in claim 1, wherein the groove extends along an entire length of the inner periphery of the joining hole.

* * * * *